United States Patent
Karpenko

(10) Patent No.: US 9,204,048 B2
(45) Date of Patent: Dec. 1, 2015

(54) STABILIZATION OF LOW-LIGHT VIDEO

(71) Applicant: Facebook, Inc., Menlo Park, CA (US)

(72) Inventor: Alexandre Karpenko, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/227,280

(22) Filed: Mar. 27, 2014

(65) Prior Publication Data

US 2015/0281580 A1    Oct. 1, 2015

(51) Int. Cl.
*H04N 5/232* (2006.01)

(52) U.S. Cl.
CPC .................... *H04N 5/23264* (2013.01)

(58) Field of Classification Search
CPC ............. H04N 5/23264; G06F 17/30781; G03B 2207/005
See application file for complete search history.

(56) References Cited

U.S. PATENT DOCUMENTS

| | | | | |
|---|---|---|---|---|
| 8,189,070 | B1 * | 5/2012 | Brunner et al. | 348/229.1 |
| 2011/0280541 | A1 * | 11/2011 | Lee | 386/226 |
| 2013/0243408 | A1 * | 9/2013 | Anthony et al. | 386/353 |

* cited by examiner

*Primary Examiner* — Mekonnen Dagnew
(74) *Attorney, Agent, or Firm* — Baker Botts L.L.P.

(57) ABSTRACT

In one embodiment, a method includes receiving information indicative of an amount of light present for capturing an image frame of a video clip, and, based on the amount of light present, determining a candidate exposure time for the image frame. The method also includes determining a maximum exposure time for the image frame. If the candidate exposure time is less than or substantially equal to the maximum exposure time, the method includes capturing the image frame with approximately the candidate exposure time. If the candidate exposure time is greater than the maximum exposure time, the method includes capturing the image frame with approximately the maximum exposure time.

32 Claims, 4 Drawing Sheets

STABILIZATION OF LOW-LIGHT VIDEO

TECHNICAL FIELD

This disclosure generally relates to stabilization of digital video.

BACKGROUND

A mobile computing device—such as a smartphone, camera, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

A mobile computing device that includes a digital camera may be used to record or capture digital video. During recording, unintended movement of a camera, or camera shake, whether caused by shaking hands or other vibration sources, can lead to undesirable effects in videos, such as a shaky or jerky motion of a video. In particular embodiments, a video-stabilization routine may be applied to a video clip or a particular length of video to reduce the effects of camera shake when the video is viewed or played back. There are numerous video-stabilization (or, image-stabilization) techniques that can be applied to digital videos to reduce the effect of camera shake. This disclosure contemplates any suitable video-stabilization technique.

In particular embodiments, a video-stabilization technique may lead to undesirable motion blur (or, motion-blur artifacts) in a video, where motion blur refers to a smearing, blurring, or bleeding-out of video images caused by motion of a camera during recording. Motion blur can occur when a camera collects light for a particular image frame of video, and as it collects light, the camera may move, in part due to camera shake. This camera motion may create a motion trail in the image, and, while applying image stabilization may reduce the shaky or jerky motion of a video caused by camera shake during recording, image stabilization generally does not modify the pixels of the image. That is, some pixels may still contain a motion trail, which can produce a motion-blur artifact, and so, after an image stabilization routine is applied to a video clip, motion blur artifacts may remain in the video. Motion blur, while generally undesirable, may not be too apparent or problematic in a shaky video because the shaky video and the motion blur generally occur together in a synchronized fashion. In particular embodiments, once a video stabilization technique is applied, a motion-blur artifact can appear peculiar or unpleasant to a viewer and can be quite noticeable because the camera shake that produced the motion blur has been reduced or removed from the video, leaving just the motion-blur artifact without the associated motion.

In particular embodiments, one factor that may determine whether motion blur may occur in a stabilized video is the amount of camera movement during recording, since excessive camera movement can lead to motion blur. In particular embodiments, another factor that may determine whether motion blur may appear in a stabilized video is the amount of light present while recording a video. If there is a low-light condition, the exposure time may be long enough and the camera may move enough to make motion blur a problem. In particular embodiments, in a low-light condition, a camera's relatively long shutter time may lead to motion blur. In particular embodiments, a mobile computing device may apply a maximum shutter time while a video is being recorded. In particular embodiments, a maximum shutter time may be selected so that motion blur is not significantly present or apparent in a stabilized video. In particular embodiments, a determination of a maximum shutter time may be made by a computing device. In particular embodiments, a maximum shutter time may be determined so that image stabilization may be applied to a video to reduce effects associated with camera shake while not introducing unwanted motion-blur artifacts.

The embodiments disclosed above are only examples, and the scope of this disclosure is not limited to them. Particular embodiments may include all, some, or none of the components, elements, features, functions, operations, or steps of the embodiments disclosed above.

DESCRIPTION OF EXAMPLE EMBODIMENTS

Figure 1:
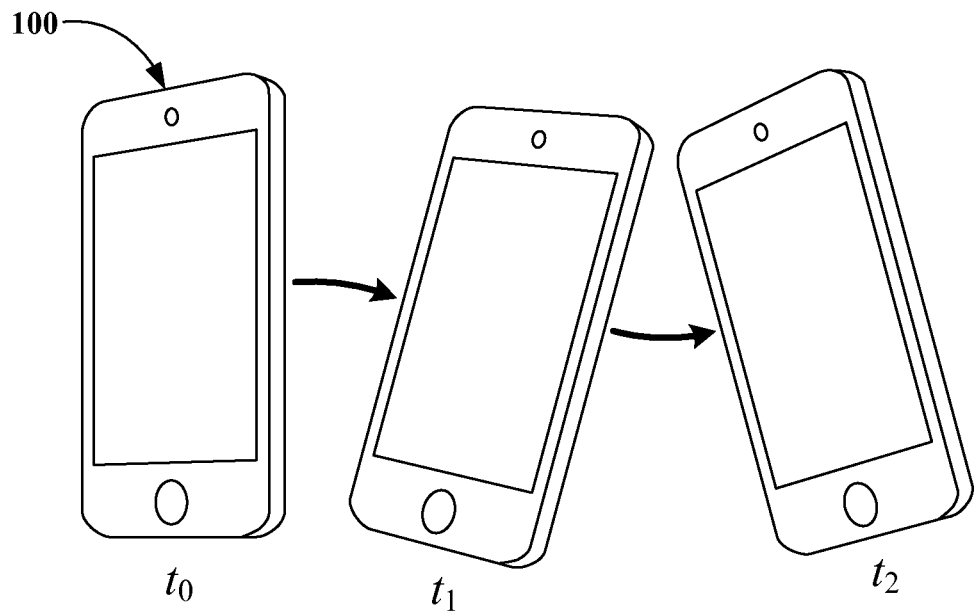
FIG. 1 illustrates an example mobile computing device undergoing example movements.

FIG. 1 illustrates an example mobile computing device 100 undergoing example physical movements. In particular embodiments, mobile computing device 100 may be a single-board computer (SBC) (such as, for example, a computer-on-module (COM) or system-on-module (SOM)), a laptop or notebook computer, a mobile telephone, a smartphone, a camera, a personal digital assistant (PDA), a tablet computer system, or a combination of two or more of these. Mobile computing device 100 may include one or more integrated cameras or an interface to one or more external cameras. In particular embodiments, mobile computing device 100 may include one or more digital cameras, where a digital camera may refer to a device that records, captures, or stores images or videos in a digital format. Herein, the term "camera" may refer to a digital camera, and the term "video" may refer to digital video or video recorded, captured or stored in a digital format. In particular embodiments, a digital camera may include an image sensor, such as for example a charge-coupled device (CCD) image sensor or a complementary metal-oxide-semiconductor (CMOS) active-pixel sensor.

This disclosure contemplates any suitable mobile computing device 100 taking any suitable physical form and including any suitable camera.

A physical movement (or, movement) of mobile computing device 100, as illustrated in FIG. 1, may include a rotational or translational displacement, velocity, or acceleration, or any suitable combination thereof. Although this disclosure describes or illustrates particular movements of mobile computing device 100, including rotational or translational displacement, velocity, or acceleration, this disclosure contemplates any suitable movements or combinations of suitable movements. In particular embodiments, mobile computing device 100 may include one or more types of sensors for detecting position, orientation, translational movement, or rotational movement of mobile computing device 100. Such motion sensors may include an accelerometer, gyroscope, or magnetometer, or any suitable combination thereof. Mobile computing device 100 may also include an interface to one or more external sensors for detecting position or movement. Although this disclosure describes particular sensors for detecting position, orientation, or movement of mobile computing device 100, this disclosure contemplates any suitable sensors for detecting position, orientation, or movement.

In particular embodiments, data, information, or values from one or more sensors may be recorded or analyzed concurrent with the recording of a video clip, and the sensor values may be used in a routine to apply video stabilization to a video clip. In particular embodiments, the term video clip may refer to a discrete section or a particular length of a video recording. In particular embodiments, a video clip may refer to any suitable length of recorded video that occurs in a single recording event, such as for example with a single initiation of a recording (e.g., pressing a "Record" button) followed at a later time by a single termination of a recording (e.g., pressing a "Stop" button). In particular embodiments, a video clip may refer to any suitable combination or series of two or more video recording events. In particular embodiments, a video clip may have a duration of 1 second, 10 seconds, 15 seconds, 1 minute, 20 minutes, 1 hour, or any suitable duration.

In particular embodiments, an image frame may refer to a single still image of a video clip, and a video clip may include one or more image frames combined together to form a video recording. In particular embodiments, a video clip may be recorded at a particular frame rate. In particular embodiments, a video clip may have a frame rate of 24 frames per second (FPS), 25 FPS, 30 FPS, 50 FPS, 60 FPS, 120 FPS, or any suitable frame rate, where frame rate may refer to a number of still images or video frames per second of a video while being recorded or played back. As an example and not by way of limitation, a video clip recorded at 25 FPS may have a time between a start point of successive frames of approximately 40 ms $$\left( = \frac{1}{\text{Frame Rate}} = \frac{1}{25} \text{ seconds} \right),$$

where a start point may refer to a point in time where capture of an image frame begins. In particular embodiments, a video clip may comprise a series of image frames, where each image frame has an associated time stamp indicating a time within the video clip when an image was captured. In particular embodiments, recording or capturing a video clip may include recording or capturing a series of image frames. In particular embodiments, recording or capturing an image frame may refer to receiving an optical image in the form of light on an image sensor of a camera, converting the received light into electronic information, and storing electronic information corresponding to the received optical image. Although this disclosure describes and illustrates particular video clips having particular durations and frame rates and including one or more recording events, this disclosure contemplates any suitable video clips including any suitable number of recording events and having any suitable durations and frame rates.

In particular embodiments, movements of a mobile computing device 100 may be determined by information or values received from one or more motion sensors (e.g., gyroscope, magnetometer, accelerometer) integrated with mobile computing device 100. In particular embodiments, mobile computing device 100 may be a smartphone that includes a camera and a gyroscope sensor. In particular embodiments, a motion sensor integrated with a mobile computing device 100 may include a vibrating-structure gyroscope manufactured with micro-electro-mechanical systems (MEMS) technology. In particular embodiments, a gyroscope may be used to determine rotational orientation or rotational movement versus time of mobile computing device 100. In particular embodiments, a gyroscope may be a rate gyroscope that determines rotational (or angular) velocity of mobile computing device 100. As an example and not by way of limitation, a rate gyroscope may provide data, information, or values that correspond to angular velocity of mobile computing device 100 in units of radians/s or degrees/s. In particular embodiments, a rotational (or angular) orientation of a mobile computing device 100 may be determined by integration of gyroscope sensor data with respect to time. In particular embodiments, angular orientation θ(t) may represent an angle of a camera with respect to time and relative to one or more axes of a particular two- or three-dimensional coordinate system. In particular embodiments, angular orientation or motion may be determined in reference to various rotational axes, such as for example, a pitch axis, a roll axis, or a yaw axis. In particular embodiments, integration of sensor data may be performed by summing or averaging sensor data over a particular time interval. As an example and not by way of limitation, given an initial angular orientation θ($t_1$) at a time $t_1$ and an angular velocity ω(t) as determined by a rate gyroscope, an angular orientation at a later time $t_2$ may be determined from the expression θ($t_2$)=θ($t_1$)+ω(t)×($t_2$−$t_1$). In particular embodiments, the expression ω(t) may be evaluated at a time t such that $t_1$≤t≤$t_2$. In particular embodiments, the expression ω(t) may represent an average value of ω(t) evaluated over a time interval from $t_1$ to $t_2$.

In particular embodiments, a magnetometer (e.g., a magnetic field sensor) may be used to measure orientation or rotational movement of mobile computing device 100. A magnetometer may sense the earth's magnetic field or any other suitable, substantially static magnetic field to determine an angular orientation of mobile computing device 100. In particular embodiments, an accelerometer may be used to determine a translational or rotational movement of mobile computing device 100. In particular embodiments, accelerometer sensor data may be used to determine a linear acceleration of mobile computing device 100. Moreover, integrating accelerometer data over a particular time interval may be used to determine a velocity of mobile computing device 100, and performing a second integration operation may allow determination of a position of mobile computing device 100 as a function of time. In particular embodiments, rotational or translational movement of mobile computing device 100 may be determined by analyzing images that make up a video clip. As an example and not by way of limitation, feature-based analysis may be used to track one or more features (e.g., distinct, stationary objects or edges) in images of a video clip and determine a camera's motion from position changes of the features between images.

The example of FIG. 1 illustrates mobile computing device 100 undergoing a series of example movements which may be associated, at least in part, with camera shake. In particular embodiments, movement of mobile computing device 100 may arise from a combination of camera shake along with intended movement (e.g., panning of a camera). In particular embodiments, camera shake may refer to an unintended or unwanted movement, shake, or vibration of a camera during recording of a video clip. As an example and not by way of limitation, camera shake may arise, at least in part, from movement of one or more hands while holding a camera, from movement of a person's body while holding a camera (e.g., while a person is walking, running, or jumping), from movement of an object where a camera is located (e.g., motion of a helmet, bike, airplane, train, or car from which a video is being recorded), or from any suitable combination of such movements. This disclosure contemplates any suitable camera shake arising from any suitable one or more sources or movements.

In FIG. 1, movements may include one or more rotations, translations, or any suitable combination of one or more rotations or translations of mobile computing device 100. Movements illustrated in FIG. 1 (and below in FIG. 2) may be exaggerated for clarity. In particular embodiments, rotations or translations associated with camera shake may include non-gradual, abrupt, or unintentional changes in orientation or position. In FIG. 1, mobile computing device 100 may have an initial orientation at time $t_0$ (left of FIG. 1), may move to another orientation at time $t_1$ (middle of FIG. 1), and then may move to another orientation at time $t_2$ (right of FIG. 2). In FIG. 1, movements of mobile computing device 100 may include rotation, translation, or both rotation and translation. In particular embodiments, a computing device may apply a video-stabilization routine based on the rotational motion, the translational motion, or both the rotational and translational motion of mobile computing device 100. In particular embodiments, a mobile computing device 100 may undergo movements that may include both rotational and translational motion, and a computing device may apply a video-stabilization routine based on the rotational motion of mobile computing device 100. Although this disclosure describes and illustrates particular movements of a mobile computing device 100 having particular characteristics, this disclosure contemplates any suitable movements of a mobile computing device having any suitable characteristics.

Figure 2:
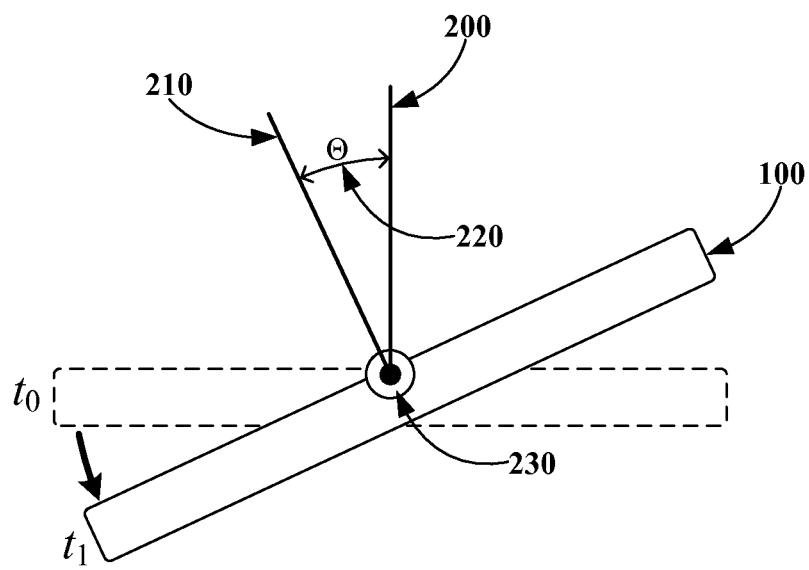
FIG. 2 illustrates an example mobile computing device undergoing an example rotation.

FIG. 2 illustrates a top-view of an example mobile computing device 100 undergoing an example rotation by an angle Θ 220. In FIG. 2, mobile computing device 100 may include a camera, and rotation of mobile computing device 100 may result, at least in part, from camera shake. In FIG. 2, mobile computing device 100 may have an initial orientation at time $t_0$ and may be rotated by angle Θ 220 to a final orientation at time $t_1$. Lines 200 and 210 may be substantially orthogonal to a face of mobile computing device 100 where a camera or a camera lens is located. Line 200 and line 210 may indicate initial and final orientations of mobile computing device 100, respectively, and angle Θ 220 between lines 200 and 210 may represent an amount of rotation of mobile computing device 100. In FIG. 2, vector 230 may represent a motion vector associated with a rotation of mobile computing device 100 from an initial to a final orientation. Motion vector 230 may be oriented orthogonal to lines 200 and 210 and may be oriented along a rotation axis about which mobile computing device 100 is rotated.

In particular embodiments, rotational motion of mobile computing device 100 between two orientations may be represented by a vector oriented along an axis of rotation and having a magnitude proportional to a magnitude of rotation. In particular embodiments, rotational motion or orientation may be illustrated using motion vectors, where a motion vector may represent a motion of a mobile computing device 100 from one position to another. In particular embodiments, quaternions, Euler angles, or rotation matrices may be used to represent or determine orientations or rotations of mobile computing device 100. Although this disclosure describes and illustrates particular representations of orientation or rotation, this disclosure contemplates any suitable representation of orientation or rotation.

In particular embodiments, an amount of camera shake may be determined by a camera's motion or orientation from one frame to the next in a video clip, as indicated, for example, by a gyroscope sensor. As an example, if a video clip has motion in a particular direction for a frame, and a motion in a subsequent frame continues along substantially the same direction, then it may be determined that the camera was moving smoothly and not shaking or moving in a jerky fashion. In particular embodiments, if the camera orientation or the camera shake changes direction frequently, then there may be a problem with motion blur in a stabilized video. In particular embodiments, a series of motions with a relatively large change in motion vector angle may indicate mobile computing device 100 undergoing movements caused at least in part by camera shake. In particular embodiments, a series of motions with a relatively small change in motion vector angle may indicate mobile computing device 100 undergoing movements not associated with camera shake (e.g., camera of mobile computing device 100 may be panning).

In particular embodiments, if there is a significant amount of camera shake, then there may also be a significant angle between motion vectors. In particular embodiments, the larger the angle, the more problematic motion blur may be in a stabilized video clip. In particular embodiments, a low-pass filter may be applied to a camera's orientation information to obtain a camera's stabilized orientation or motion (or, synthetic- or virtual-camera orientation or motion). In particular embodiments, a motion vector may be compared with a camera's stabilized orientation or motion to determine an amount of camera shake. Although this disclosure describes and illustrates particular techniques for determining and quantifying camera shake, this disclosure contemplates any suitable technique for determining or quantifying camera shake.

In particular embodiments, a factor that may determine whether motion blur may appear in a stabilized video is the amount of light present while recording a video. In particular embodiments, the amount of light present may be determined from a camera's exposure time. Exposure time (or shutter speed) may refer to how long a camera's shutter is open or how long a sampling time is used when capturing a particular image. In particular embodiments, a camera may determine an exposure time based on an amount of light reaching the camera's image sensor. In particular embodiments, an amount of light reaching a camera's image sensor may be determined from information, data, or a signal from the image sensor or from an optical detector integrated with the camera. In particular embodiments, an exposure time determined by a camera may be referred to as a candidate exposure time. In particular embodiments, the amount of light that reaches an image sensor of a camera may be proportional to the exposure time. In particular embodiments, during recording of a video clip, mobile computing device 100 may determine an exposure time for each frame of a video clip. In particular embodiments, mobile computing device 100 may determine an exposure time for particular frames (e.g., every other frame, or every third frame) during recording of a video clip. In particular embodiments, mobile computing device 100 may determine an exposure time periodically, such as for example every 0.1 seconds, every 1 second, or any suitable time interval. In particular embodiments, techniques for determining the amount of light present may include using a light sensor integrated with a camera or analyzing frames for indication of light levels or brightness.

In particular embodiments, in low-light conditions, a camera may have a relatively long exposure time, which may make a video clip more susceptible to motion blur. As examples and not by way of limitation, a typical exposure time in bright light (e.g., outdoors in sunshine) may be approximately 0.5 ms, while a typical exposure time in low light (e.g., indoors, in a dimly-lit room, or in a darkened space) may be approximately 30 ms. In bright light, motion blur may not present a significant problem because of a camera's relatively short exposure time. In particular embodiments, given bright-light conditions and a short exposure time, motion blur may arise from a relatively large amplitude or high frequency of camera motion, and significant motion blur may not occur for typical camera motions associated with camera shake. Under low-light conditions, motion blur may occur since it may be difficult to stabilize an image by holding a camera steady for a time on the order of a relatively long exposure time.

Figure 3:
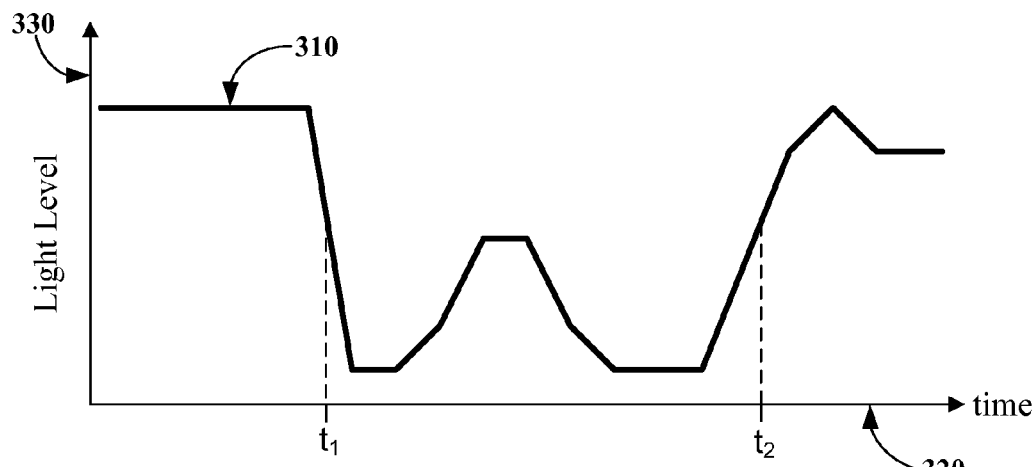
FIG. 3 illustrates example amounts of light present during recording of an example video clip.

FIG. 3 illustrates example amounts of light present during recording of an example video clip. In FIG. 3, line 310 represents an amount of light (or, light level, luminance, or brightness) present during recording of a video clip. Light level 310 is plotted along horizontal time axis 320, which represents an example time indicator for a video clip, and vertical axis 330, which represents an amount of light in arbitrary units. In particular embodiments, light level 310 may refer to an optical power, a luminance, or an optical intensity of light incident on an image sensor of a camera. In particular embodiments, light level 310 may refer to an amount of light, an amount of optical energy, or an approximate number of photons incident on an image sensor of a camera during a time interval, such as for example during a time interval when light for a single image frame is captured. In particular embodiments, light level 310 may refer to an optical power or an amount of light as determined by an optical sensor, such as for example an image sensor, optical detector, or light meter integrated with or connected to a camera.

In FIG. 3, light level 310 may vary with time as a video is recorded. Before time $t_1$ and after time $t_2$ in FIG. 3, light level 310 may be relatively high, corresponding to a portion of video recorded under relatively bright-light conditions (e.g., outdoors in daylight or in a brightly lit room). In FIG. 3, between times $t_1$ and $t_2$, light level 310 may be relatively low to moderate, indicating a portion of video recorded under low-light or moderate-light conditions (e.g., outdoors at twilight or nighttime, or indoors in a moderately- or dimly-lit room). In particular embodiments, as illustrated below in FIG. 4, a mobile computing device 100 may adjust a camera's exposure time while a video is being recorded. In particular embodiments, video recorded under relatively low-light conditions may have relatively long exposure times, and video recorded under relatively bright-light conditions may have relatively short exposure times.

Figure 4:
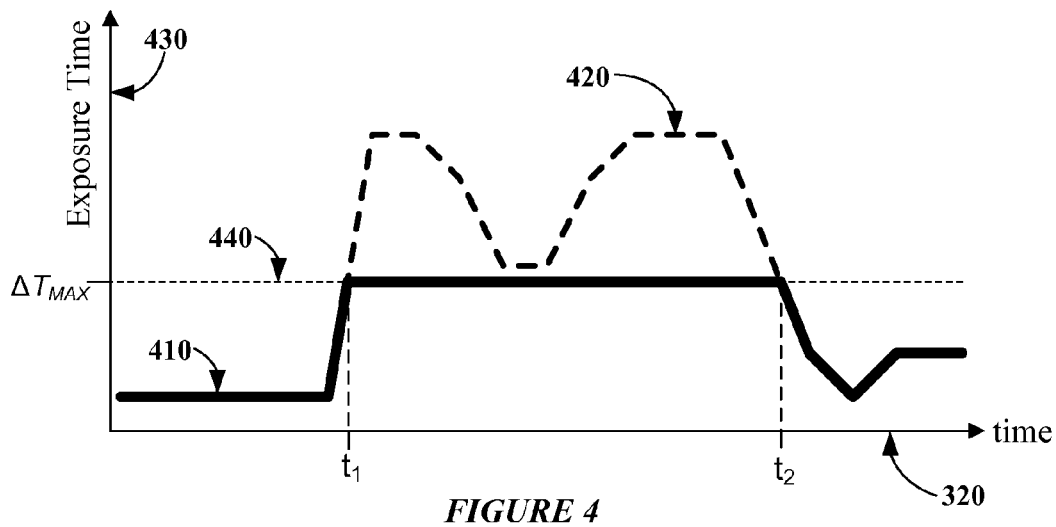
FIG. 4 illustrates example exposure times for an example video clip recorded with the example amounts of light of FIG. 3.

FIG. 4 illustrates example exposure times for an example video clip recorded with the example amounts of light of FIG. 3. In FIG. 4, lines 410 and 420 represent example exposure times (ΔT) for frames of a video clip. In FIG. 4, exposure time is plotted along horizontal time axis 320 and vertical axis 430 representing exposure time in arbitrary units. In FIG. 4, exposure time 420 may represent an exposure time determined by mobile computing device 100 based at least in part on amount of light present 310 during recording. Exposure time 420 varies approximately inversely to light level 310, so that when light level 310 is relatively low, exposure time 420 may be relatively long, and vice versa. Between times $t_1$ and $t_2$, when exposure time 420 may be relatively long, a stabilized video clip recorded with exposure time 420 may exhibit motion-blur artifacts.

In FIG. 4, exposure time (ΔT) 410 may represent an exposure time for a video clip where a maximum exposure time ($\Delta T_{MAX}$) 440 has been applied to the video recording so that $\Delta T \leq \Delta T_{MAX}$. In particular embodiments, a maximum exposure time ($\Delta T_{MAX}$) 440 may represent an exposure time below which (e.g., exposure time $<\Delta T_{MAX}$) a video clip may exhibit little or no motion-blur artifacts and above which (e.g., exposure time $>\Delta T_{MAX}$) a video clip may exhibit motion-blur artifacts. In FIG. 4, maximum exposure time ($\Delta T_{MAX}$) 440 represents a maximum duration of exposure time used for recording or capturing a single image frame. In particular embodiments, an exposure time may be determined for each image frame and applied to each image frame of a video clip while the video is being recorded. In particular embodiments, an exposure time may be determined for and applied to a set of two or more successive image frames while a video is being recorded.

In FIGS. 3 and 4, before time $t_1$ and after time $t_2$, light level 310 is relatively high, and corresponding exposure time 410 is relatively short and coincides with exposure time 420. In FIG. 3, between times $t_1$ and $t_2$, light level 310 may be relatively low to moderate, and in FIG. 4, corresponding exposure time 420 is capped or limited to a maximum value so that $\Delta T \cong \Delta T_{MAX}$. After having a video-stabilization routine applied to it, a video clip recorded with exposure time 410 may exhibit little or no motion-blur artifacts associated with camera shake. Between times $t_1$ and $t_2$, a video clip recorded with exposure time 410 may not exhibit significant motion blur due, at least in part, to exposure time 410 being limited to not exceed maximum exposure time $\Delta T_{MAX}$ 440.

In particular embodiments, maximum exposure time $\Delta T_{MAX}$ may be determined so that a video clip, after having a video-stabilization routine applied to it, may exhibit little or no significant motion blur associated with camera shake. In particular embodiments, a stabilized video may have little or no significant motion blur when approximately 90%, 95%, 98%, 99%, or any suitable percentage of a stabilized video clip is substantially free of motion-blur artifacts. In particular embodiments, a stabilized video may have little or no significant motion blur when approximately 10%, 5%, 2%, 1%, or any suitable percentage of a stabilized video clip may contain motion-blur artifacts. In particular embodiments, maximum exposure time $\Delta T_{MAX}$ may be set to a value of 1 ms, 2 ms, 5 ms, 10 ms, or any suitable value. In particular embodiments, while a video is being recorded, mobile computing device 100 may dynamically determine, adjust, or update a maximum exposure time $\Delta T_{MAX}$ based in part on an amount of motion of mobile computing device 100 as determined by a motion sensor. As an example and not by way of limitation, $\Delta T_{MAX}$ may be set to 10 ms while mobile computing device 100 is being held steadily, and $\Delta T_{MAX}$ may be set to 2 ms while mobile computing device 100 is undergoing one or more non-gradual or abrupt changes in orientation or position.

Figure 5:
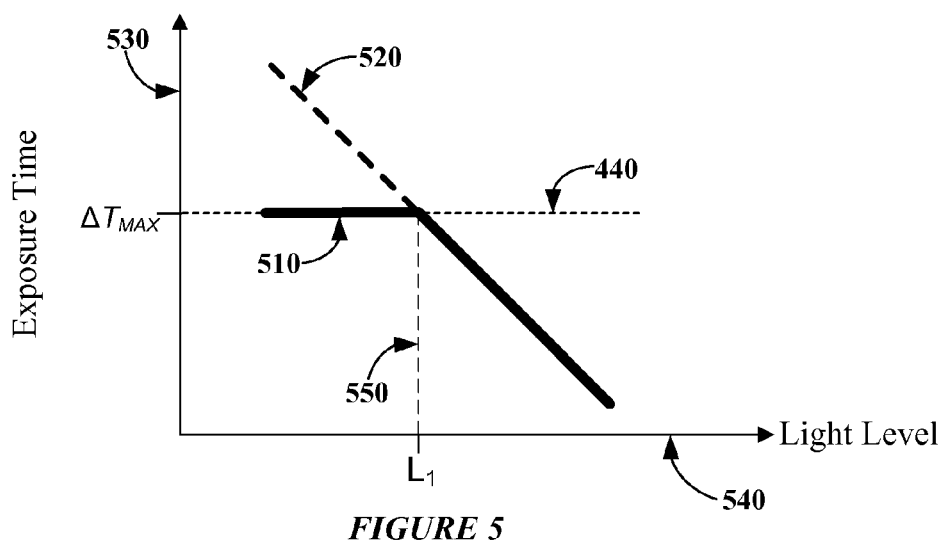
FIG. 5 illustrates an example exposure time plotted versus an example amount of light.

FIG. 5 illustrates an example exposure time plotted versus an example amount of light 540. In FIG. 5, vertical axis 530 represents exposure time in arbitrary units. In FIG. 5, exposure time 520 is a substantially straight line, and exposure time 510 is piecewise linear. In FIG. 5, for light levels greater than $L_1$ 550, exposure time 510 has a substantially linear portion that is substantially coincident with exposure time 520, and for light levels less than $L_1$ 550, exposure time 510 has a substantially horizontal portion approximately equal to maximum exposure time $\Delta T_{MAX}$ 440. In FIG. 5, exposure time 520 may correspond to exposure time 420 of FIG. 4, where exposure times 420 and 520 vary approximately inversely to light level. In particular embodiments, exposure time 520 may be referred to as a candidate exposure time. In particular embodiments, a candidate exposure time may correspond to an exposure time determined by mobile computing device 100 based on an amount of light present for capturing an image frame. In FIG. 5, exposure time 510 may correspond to exposure time 410 of FIG. 4, where exposure times 410 and 510 are limited to not exceed a maximum exposure time $\Delta T_{MAX}$ 440. In particular embodiments, exposure time may vary linearly, exponentially, logarithmically, or may have any suitable curved-shape with respect to light level. Although this disclosure describes and illustrates exposure times with particular variation with respect to light level, this disclosure contemplates any suitable variation of exposure time with respect to light level.

In particular embodiments, a mobile computing device 100 may determine an amount of electronic gain to apply to an image sensor or an electronic amplifier coupled to the image sensor. In particular embodiments, an amount of electronic gain may, at least in part, depend on an exposure time or on an amount of light present during recording. In particular embodiments, such an amount of electronic gain may be referred to as a baseline or standard amount of gain. In particular embodiments, having a maximum exposure time may limit the amount of light incident on a camera's image sensor in low- or moderate-light conditions. In particular embodiments, mobile computing device 100 may increase an electronic gain of an image sensor or an electronic amplifier coupled to the image sensor when recording video in low- or moderate-light conditions. In particular embodiments, mobile computing device 100 may increase an electronic gain of an image sensor or an electronic amplifier coupled to the image sensor to a gain value greater than its baseline gain value. In particular embodiments, mobile computing device may increase an electronic gain of an image sensor or an electronic amplifier coupled to the image sensor when exposure time is close to or substantially equal to maximum exposure time (e.g., $\Delta T \cong \Delta T_{MAX}$). In particular embodiments, under low- or moderate-light conditions, an image sensor's electronic gain may be increased to compensate, at least in part, for a reduction in photons incident on a camera's image sensor due to exposure time 410 or 510 being limited to maximum value 440. In particular embodiments, a video clip recorded with an increased electronic gain may contain an increased amount of image noise compared with a video clip recorded without an increased gain. In particular embodiments, image noise may refer to undesired or substantially random variations in brightness or color within an image frame or between image frames of a video clip. In particular embodiments, applying a video compression routine to a video clip may reduce the apparent amount of image noise in the video clip, in part by dithering of the image frames associated with video compression. In particular embodiments, video compression routines or formats may include H.264 and Moving Picture Experts Group-4 Part 2 (MPEG-4 Part 2). This disclosure contemplates any suitable video compression format applied to any suitable video clip.

In particular embodiments, a maximum exposure time may be determined by mobile computing device 100. In particular embodiments, a maximum exposure time may be set to a predetermined or fixed value and stored in a memory of mobile computing device 100. In particular embodiments, mobile computing device 100 may determine a maximum exposure time dynamically or in real-time. In particular embodiments, mobile computing device 100 may determine a maximum exposure time based in part on an amount of motion of mobile computing device 100 as determined by a motion sensor. In particular embodiments, if mobile computing device 100 determines that it is undergoing a significant or relatively large amount of camera shake while recording a portion of a video, mobile computing device 100 may set maximum exposure time to a relatively low value (e.g., 2 ms). In particular embodiments, if mobile computing device 100 determines that it is in a relatively stable position (e.g., undergoing a relatively small or moderate amount of camera shake) while recording a portion of a video, mobile computing device 100 may set maximum exposure time to a relatively moderate value (e.g., 5-10 ms). In particular embodiments, a maximum exposure time may be dynamically adjusted, updated, or varied over the duration of a single video recording as mobile computing device 100 goes from a steady position or orientation with a relatively moderate value of exposure time to a shaky or varying position or orientation with a relatively low value of exposure time. Although this disclosure describes and illustrates particular maximum exposure times determined in particular ways, this disclosure contemplates any suitable maximum exposure time determined in any suitable way.

In particular embodiments, a camera may capture images at a frame rate that may be higher than a standard frame rate, and the images may then be combined together to form a video clip with a usual or a standard frame rate. In particular embodiments, capturing images at a higher-than-standard frame rate and then combining the resulting images may result in a video clip with reduced noise or reduced motion blur compared with a video clip captured at a standard frame rate. As an example and not by way of limitation, a camera may have a standard or usual frame rate of 30 FPS, and in particular embodiments, a camera may capture images at 60 FPS. As another example, a camera may have a standard or usual frame rate of 30 or 60 FPS, and in particular embodiments, a camera may capture images at 120 FPS. In particular embodiments, images captured at 60 FPS may have more image noise compared with images captures at 30 FPS. In particular embodiments, images captured at 60 FPS may have less motion blur than images captured at 30 FPS. In particular embodiments, two successive image frames of a video recorded at 60 FPS may be combined to form a single image frame of a 30 FPS video. In particular embodiments, four successive image frames of a video recorded at 120 FPS may be combined to form a single image frame of a 30 FPS video. In particular embodiments, combining two or more successive image frames may be performed by aligning features within image frames and then adding the two or more image frames together. In particular embodiments, adding two or more image frames together may result in a single frame with reduced image noise and reduced motion-blur artifacts compared with the image noise of the original frames. In particular embodiments, performing an addition operation on successive frames of a video recorded at a higher-than-standard frame rate (e.g., 60 FPS or 120 FPS) may result in a video clip at a standard frame rate (e.g., 24 FPS or 30 FPS) with substantially the same or reduced image noise compared with a video directly recorded at a standard frame rate (e.g., 24 FPS or 30 FPS). In particular embodiments, performing an addition operation on successive frames of a video recorded at a higher-than-standard frame rate (e.g., 60 FPS or 120 FPS) may result in a video clip at a usual or standard frame rate (e.g., 24 FPS or 30 FPS) with reduced motion blur compared with a video directly recorded at a usual or standard frame rate (e.g., 24 FPS or 30 FPS). Although this disclosure describes particular video clips recorded at particular higher-than-standard frames rates and then combined to form a video clip at a standard frame rate, this disclosure contemplates any suitable video clip recorded at any suitable higher-than-standard frame rate and then combined in any suitable fashion to form a video clip having any suitable standard frame rate.

In particular embodiments, enabling or applying a video-stabilization routine may refer to sending a video clip through a routine where effects associated with camera shake are reduced or removed from the video clip. In particular embodiments, a video-stabilization routine may include a digital routine to stabilize a video clip, and a stabilized video clip may be referred to as a digitally stabilized video clip. In particular embodiments, a video-stabilization routine may be performed in real-time by a mobile computing device 100 while recording a video. In particular embodiments, a video-stabilization routine may be performed after a video clip and suitable sensor information or values have been recorded. In particular embodiments, a video-stabilization routine may be performed by a mobile computing device 100 that has recorded a video clip. In particular embodiments, a video-stabilization routine may be performed by another computing device different from mobile computing device 100 that recorded the video clip. As an example and not by way of limitation, mobile computing device 100 may upload a video clip to a server, and an application operating on the server or a computing device connected to the server may apply video stabilization to the video clip. This disclosure contemplates any suitable video-stabilization routine performed by any suitable computing device.

In particular embodiments, a video stabilization routine may be implemented using feature-based stabilization where features in images are tracked from frame to frame to recover a camera's motion and then compensate for it. In particular embodiments, video stabilization may be implemented based on a sensor signal (e.g., gyroscope, accelerometer, or magnetometer) built-in or attached to a mobile computing device 100, where sensor information is analyzed or recorded as a video is being recorded. In such a sensor-based video-stabilization routine, sensor information may be analyzed during a recording or after a video is recorded to determine an orientation or an amount of rotation of mobile computing device 100. In particular embodiments, information from a gyroscope may be integrated with respect to time to reconstruct a camera's orientation, and the camera's orientation information may be used in a routine to stabilize a video clip. In particular embodiments, a low-pass filter may be applied to a camera's orientation information to obtain a stabilized or synthetic camera orientation, and such stabilized camera orientation information may be used in a video stabilization routine. Although this disclosure describes and illustrates particular techniques for implementing video stabilization, this disclosure contemplates any suitable video-stabilization techniques.

Figure 6:
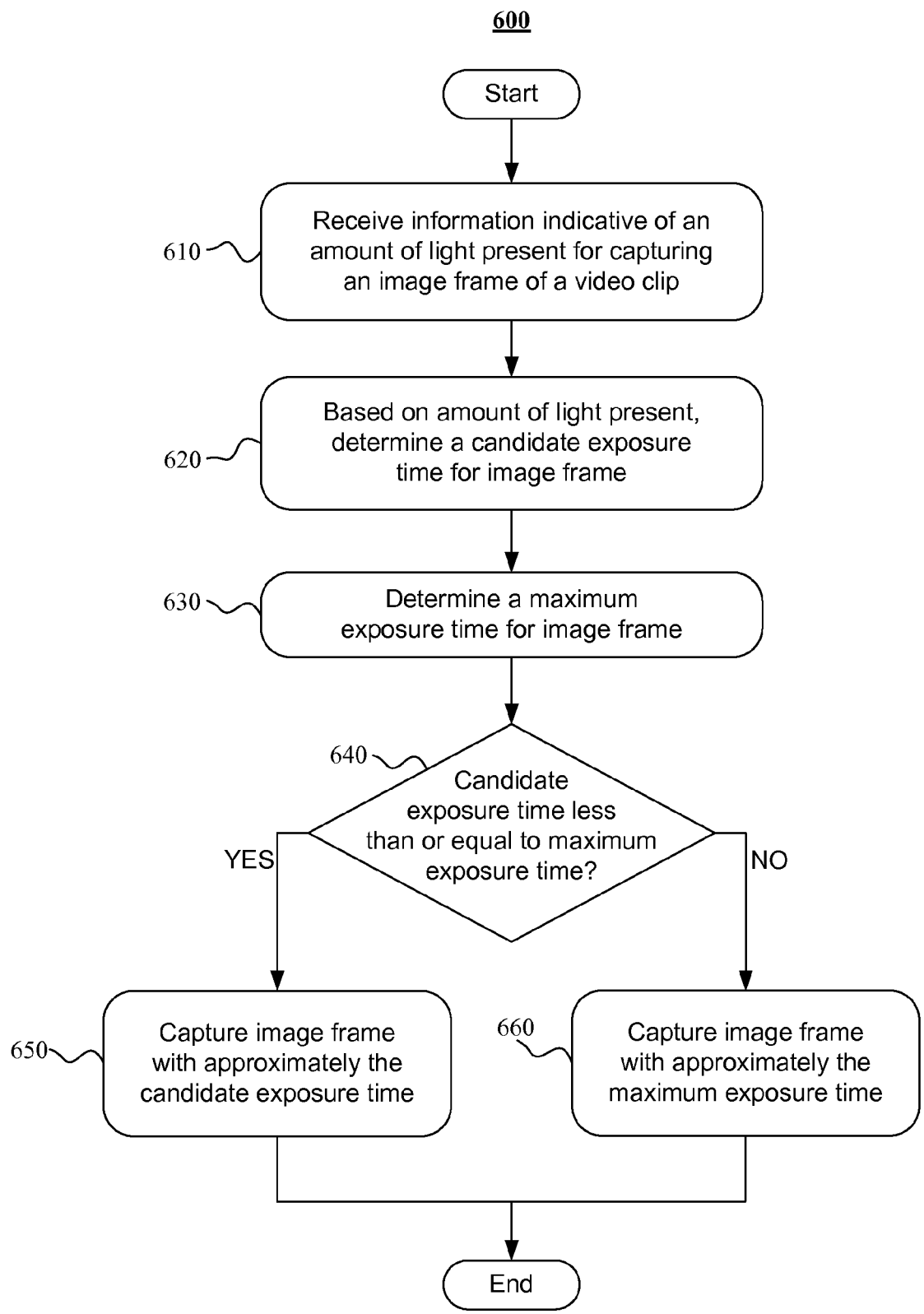
FIG. 6 illustrates an example method for capturing an image frame of a video clip.

FIG. 6 illustrates an example method 600 for capturing an image frame of a video clip. In particular embodiments, method 600 may be applied to a video clip recorded, at least in part, in low-light or moderate-light conditions. The method may begin at step 610, where information indicative of an amount of light present for capturing an image frame of a video clip may be received, and at step 620, a candidate exposure time for an image frame may be determined based on the amount of light present. At step 630, a maximum exposure time may be determined. In particular embodiments, a maximum exposure time may represent an exposure time below which a video clip may exhibit little or no motion-blur artifacts associated with camera shake. At step 640, it may be determined whether the candidate exposure time is less than or substantially equal to the maximum exposure time. If the candidate exposure time is less than or substantially equal to the maximum exposure time, then the method may proceed to step 650. At step 650, an image frame may be captured with approximately the candidate exposure time, at which point the method may end. If the candidate exposure time is greater than the maximum exposure time, then the method may proceed to step 660. At step 660, an image frame may be captured with approximately the maximum exposure time, at which point the method may end. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for capturing an image frame of a video clip, including the particular steps of the method of FIG. 6, this disclosure contemplates any suitable method for capturing an image frame of a video clip, including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
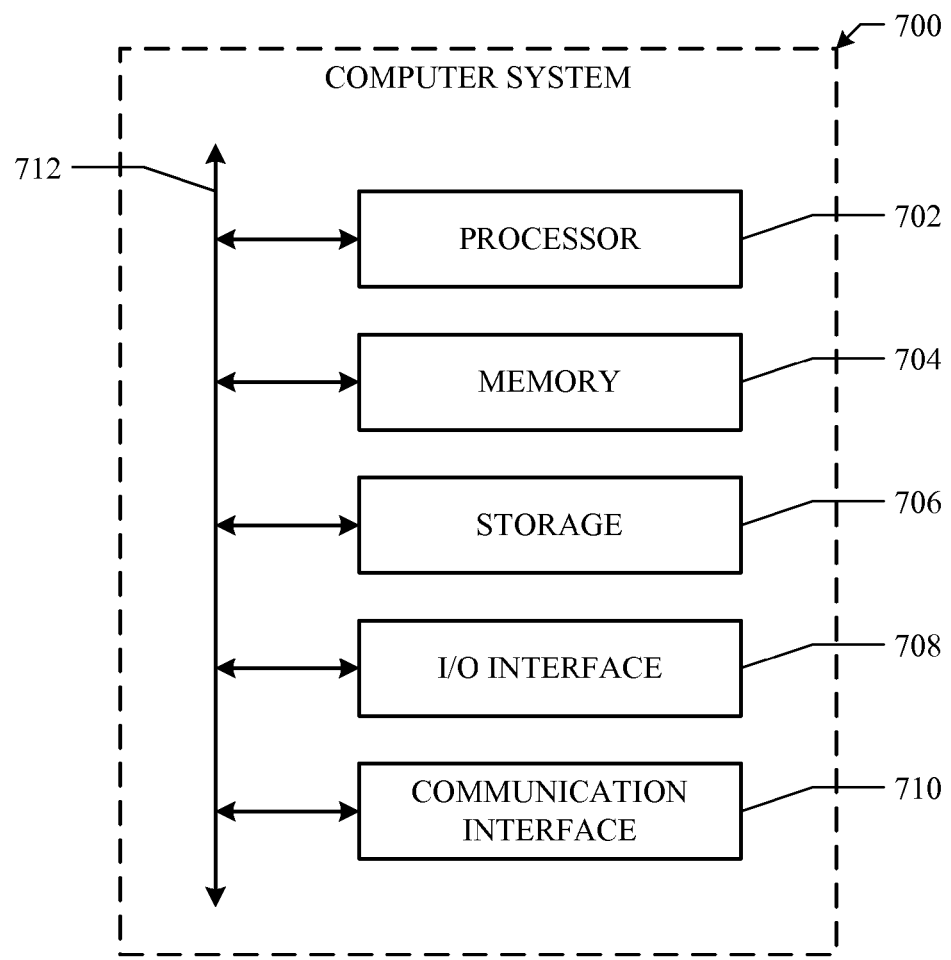
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computing device, receiving information indicative of an amount of light present for capturing an image frame of a video clip;
   by the computing device, based on the amount of light present, determining a candidate exposure time for the image frame;
   by the computing device, determining a maximum exposure time for the image frame;
   by the computing device, if the candidate exposure time is less than or substantially equal to the maximum exposure time, then capturing the image frame with approximately the candidate exposure time; and
   by the computing device, if the candidate exposure time is greater than the maximum exposure time, then capturing the image frame with approximately the maximum exposure time.

2. The method of claim 1, wherein determining the maximum exposure time comprises retrieving a stored value from a memory of the computing device.

3. The method of claim 1, wherein determining the maximum exposure time comprises:
   determining one or more amounts of motion of the computing device; and
   based on the determined one or more amounts of motion, determining the maximum exposure time.

4. The method of claim 3, further comprising:
   by the computing device, dynamically adjusting the maximum exposure time based on one or more other determined amounts of motion of the computing device; and by the computing device, capturing another image of the video clip with an exposure time based at least in part on the maximum exposure time as adjusted.

5. The method of claim 1, wherein:
the computing device comprises a camera;
the video clip comprises a plurality of image frames captured by the camera; and
based on the maximum exposure time, the video clip exhibits little or no motion-blur artifacts associated with camera shake after having a video-stabilization routine applied to the video clip.

6. The method of claim 5, wherein exhibiting little or no motion-blur artifacts associated with camera shake corresponds to approximately 98% or more of the video clip being substantially free of motion-blur artifacts associated with camera shake after having the video-stabilization routine applied to the video clip.

7. The method of claim 1, wherein:
the computing device comprises a camera and a gyroscope; and
the method further comprises:
by the computing device, receiving information from the gyroscope;
by the computing device, based on the gyroscope information, determining one or more angular orientations of the camera; and
by the computing device, based on the one or more angular orientations of the camera, applying a stabilization routine to the video clip to reduce one or more effects of camera shake in the video clip.

8. The method of claim 1, wherein:
the computing device comprises a camera; and
the maximum exposure time of the camera is approximately 5 milliseconds.

9. The method of claim 1, wherein:
the computing device comprises a camera;
the camera comprises an image sensor; and
the method further comprises:
by the computing device, if the candidate exposure time is greater than the maximum exposure time, then capturing the image frame with an electronic gain value associated with the image sensor that is greater than a baseline electronic gain value associated with the image sensor; and
by the computing device, applying a video compression routine to the video clip.

10. The method of claim 1, wherein:
the video clip is recorded at approximately four times a standard frame rate; and
the method further comprises, by the computing device, combining successive image frames of the video clip into a second video clip, wherein the second video clip has a frame rate approximately equal to the standard frame rate.

11. The method of claim 10, wherein:
the standard frame rate is approximately 30 frames per second; and
the video clip is recorded at a frame rate of approximately 120 frames per second.

12. One or more computer-readable non-transitory storage media embodying software that is operable when executed to:
receive information indicative of an amount of light present for capturing an image frame of a video clip;
based on the amount of light present, determine a candidate exposure time for the image frame;
determine a maximum exposure time for the image frame;
if the candidate exposure time is less than or substantially equal to the maximum exposure time, then capture the image frame with approximately the candidate exposure time; and
if the candidate exposure time is greater than the maximum exposure time, then capture the image frame with approximately the maximum exposure time.

13. The one or more computer-readable non-transitory storage media of claim 12, wherein:
the video clip comprises a plurality of image frames captured by a camera; and
based on the maximum exposure time, the video clip exhibits little or no motion-blur artifacts associated with camera shake after having a video-stabilization routine applied to the video clip.

14. The one or more computer-readable non-transitory storage media of claim 13, wherein exhibiting little or no motion-blur artifacts associated with camera shake corresponds to approximately 98% or more of the video clip being substantially free of motion-blur artifacts associated with camera shake after having the video-stabilization routine applied to the video clip.

15. The one or more computer-readable non-transitory storage media of claim 12, wherein the software is further operable when executed to:
receive information from a gyroscope;
based on the gyroscope information, determine one or more angular orientations of a camera; and
based on the one or more angular orientations of the camera, apply a stabilization routine to the video clip to reduce one or more effects of camera shake in the video clip.

16. The one or more computer-readable non-transitory storage media of claim 12, wherein:
determining the maximum exposure time comprises:
determining one or more amounts of motion of a computing device; and
based on the determined one or more amounts of motion, determining the maximum exposure time; and
the software is further operable when executed to:
dynamically adjust the maximum exposure time based on one or more other determined amounts of motion of the computing device; and
capture another image of the video clip with an exposure time based at least in part on the maximum exposure time as adjusted.

17. The one or more computer-readable non-transitory storage media of claim 12, wherein the software is further operable when executed to:
if the candidate exposure time is greater than the maximum exposure time, then capture the image frame with an electronic gain value associated with an image sensor of a camera that is greater than a baseline electronic gain value associated with the image sensor; and
apply a video compression routine to the video clip.

18. The one or more computer-readable non-transitory storage media of claim 12, wherein:
the video clip is recorded at approximately four times a standard frame rate; and
the software is further operable when executed to combine successive image frames of the video clip into a second video clip, wherein the second video clip has a frame rate approximately equal to the standard frame rate.

19. The one or more computer-readable non-transitory storage media of claim 18, wherein:
the standard frame rate is approximately 30 frames per second; and the video clip is recorded at a frame rate of approximately 120 frames per second.

20. A system comprising:
one or more processors; and
a memory coupled to the processors comprising instructions executable by the processors, the processors being operable when executing the instructions to:
receive information indicative of an amount of light present for capturing an image frame of a video clip;
based on the amount of light present, determine a candidate exposure time for the image frame;
determine a maximum exposure time for the image frame;
if the candidate exposure time is less than or substantially equal to the maximum exposure time, then capture the image frame with approximately the candidate exposure time; and
if the candidate exposure time is greater than the maximum exposure time, then capture the image frame with approximately the maximum exposure time.

21. The one or more computer-readable non-transitory storage media of claim 12, wherein determining the maximum exposure time comprises retrieving a stored value from a memory of a computing device.

22. The one or more computer-readable non-transitory storage media of claim 12, wherein the maximum exposure time is approximately 5 milliseconds.

23. The system of claim 20, wherein determining the maximum exposure time comprises retrieving a stored value from the memory.

24. The system of claim 20, wherein determining the maximum exposure time comprises:
determining one or more amounts of motion of the system; and
based on the determined one or more amounts of motion, determining the maximum exposure time.

25. The system of claim 24, wherein the processors are further operable when executing the instructions to:
dynamically adjust the maximum exposure time based on one or more other determined amounts of motion of the system; and
capture another image of the video clip with an exposure time based at least in part on the maximum exposure time as adjusted.

26. The system of claim 20, wherein:
the system further comprises a camera;
the video clip comprises a plurality of image frames captured by the camera; and
based on the maximum exposure time, the video clip exhibits little or no motion-blur artifacts associated with camera shake after having a video-stabilization routine applied to the video clip.

27. The system of claim 26, wherein exhibiting little or no motion-blur artifacts associated with camera shake corresponds to approximately 98% or more of the video clip being substantially free of motion-blur artifacts associated with camera shake after having the video- stabilization routine applied to the video clip.

28. The system of claim 20, wherein:
the system further comprises a camera and a gyroscope; and
the processors are further operable when executing the instructions to:
receive information from the gyroscope;
based on the gyroscope information, determine one or more angular orientations of the camera; and
based on the one or more angular orientations of the camera, apply a stabilization routine to the video clip to reduce one or more effects of camera shake in the video clip.

29. The system of claim 20, wherein:
the system further comprises a camera; and
the maximum exposure time of the camera is approximately 5 milliseconds.

30. The system of claim 20, wherein:
the system further comprises a camera;
the camera comprises an image sensor; and
the processors are further operable when executing the instructions to:
if the candidate exposure time is greater than the maximum exposure time, then capture the image frame with an electronic gain value associated with the image sensor that is greater than a baseline electronic gain value associated with the image sensor; and
apply a video compression routine to the video clip.

31. The system of claim 20, wherein:
the video clip is recorded at approximately four times a standard frame rate; and
the processors are further operable when executing the instructions to combine successive image frames of the video clip into a second video clip, wherein the second video clip has a frame rate approximately equal to the standard frame rate.

32. The system of claim 31, wherein:
the standard frame rate is approximately 30 frames per second; and
the video clip is recorded at a frame rate of approximately 120 frames per second.

* * * * *